Aug. 28, 1923.
R. E. PEARSON
ELECTRIC COOKING AND HEATING APPARATUS
Filed March 16, 1922
1,465,995
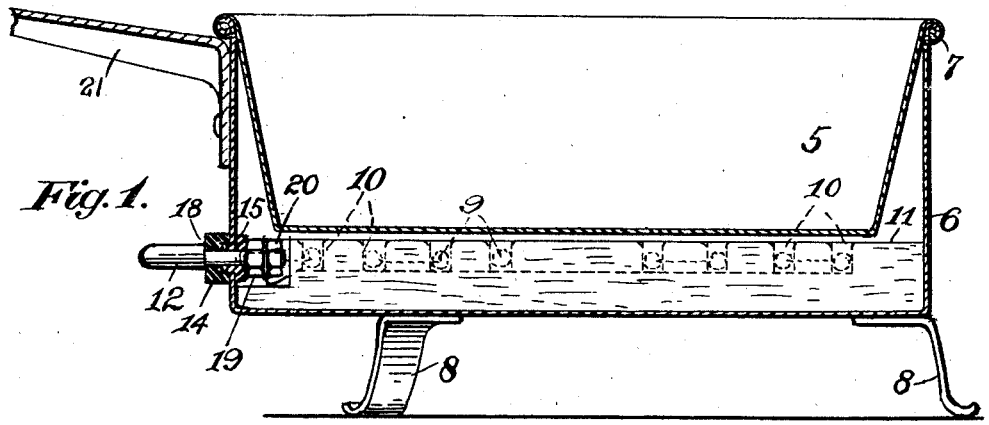
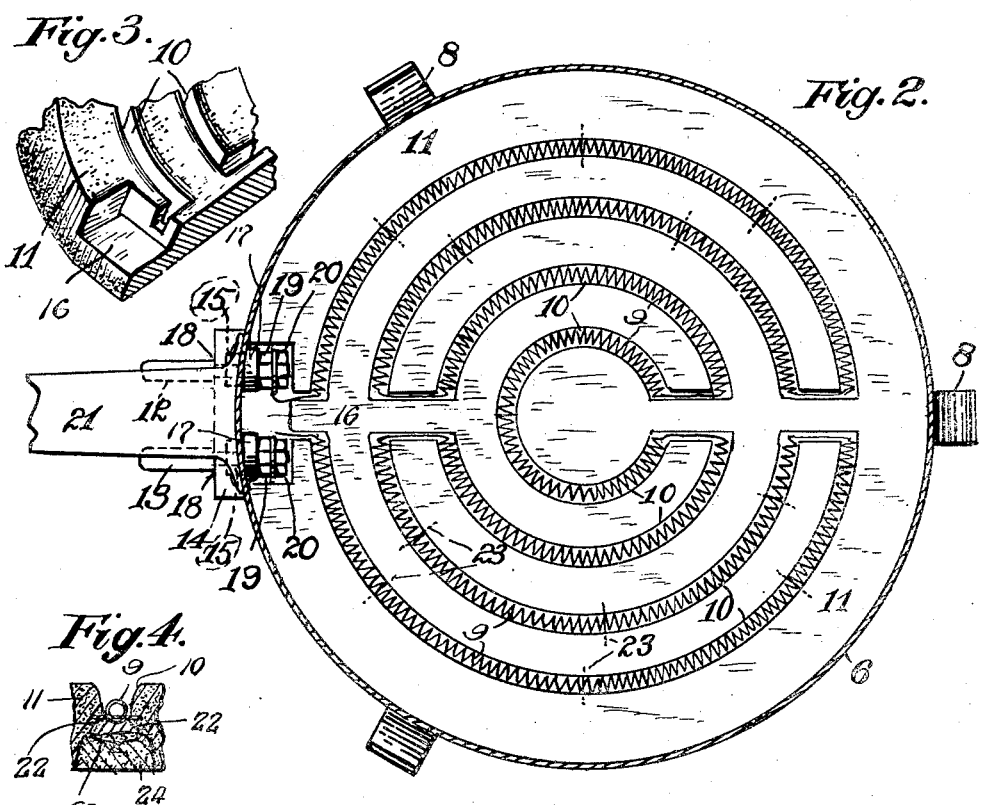
Inventor.
R. E. Pearson,
By his Attorney John O. Seifert Patented Aug. 28, 1923.

1,465,995

UNITED STATES PATENT OFFICE.

ROBERT E. PEARSON, OF YONKERS, NEW YORK.

ELECTRIC COOKING AND HEATING APPARATUS.

Application filed March 16, 1922. Serial No. 544,104.

*To all whom it may concern:*

Be it known that I, ROBERT E. PEARSON, a citizen of the United States, and a resident of Yonkers, in the county of Westchester and State of New York, have invented certain new and useful Improvements in Electric Cooking and Heating Apparatus, of which the following is a specification.

This invention relates to electric translating devices, and particularly to devices for culinary purposes, such as cooking utensils and the like, and it is the object of the invention to provide a device of this character in which the heating element is arranged in a substantially air and liquid tight chamber whereby the device as a whole may be immersed in water when cleaning without the possibility of leakage into said chamber and a consequent impairing of the heating element, and to provide a cooking utensil which is novel, cheap to manufacture and highly efficient in use.

It is a further object of the invention to provide a device as above set forth in which a carrier of non-conducting and heat insulating material is provided for the resistance coil arranged to maintain the same in close proximity with the wall of the receptacle to be heated, and preferably having a reflective and deflective surface to direct the heat radiated by the coil against such object or receptacle, the coil carrier being mounted in a casing in which the receptacle is suspended and the side wall of the receptacle being arranged with relation to the side wall of the casing to provide an air space between the same, whereby the heat transmitted to the receptacle from the heating coil will be transmitted to the side of the receptacle and the conducting of such heat to the wall of the casing and the dissipating of the same reduced to a minimum.

A further object of the invention relates to an improved electric heating element comprising a mass of non-conducting and heat insulating material arranged in the form of a plate and having a recess or recesses in one face thereof with the wall of the recesses arranged as a heat reflective and deflective surface, with a heating coil engaging in said recessed surface.

In the drawing accompanying and forming a part of this specification, Figure 1 is a sectional side elevation of an electric cooking utensil illustrating an embodiment of my invention.

Figure 2 is a plan view of the casing for the heating element and the receptacle.

Figure 3 is a perspective view of a fragment of the coil carrier; and

Figure 4 is a sectional view of a portion of the coil carrier to show the arrangement of the recess and the arrangement of the coil therein.

Similar characters of reference designate like parts throughout the different views of the drawing.

In the embodiment of the invention shown in the drawing a receptacle 5 is supported at the edge portion of its opening upon the side wall of a casing 6 to suspend the receptacle in the casing, and the receptacle and casing are connected in substantial fluid tight connection as by rolling the edge portions thereof into interlocking relation, as shown at 7, and it may also be soldered at this connection. The receptacle extends in the casing for such a distance as to provide a space between the bottom of the receptacle and casing and the side wall of the receptacle converges downward providing an air space between the sides of the receptacle and casing for a purpose to be hereinafter described. The casing may be provided with feet 8 to support the same.

The receptacle 5 serves as a container for the article or articles to be cooked or heated while the heating element is contained within the casing 6 interposed in the space between the bottom of the receptacle and casing. This heating element comprises a resistance coil 9 which is carried in a recess or recesses 10 arranged in the upper surface of non-conducting and heat insulating material in the form of a plate 11, a material termed "silocel" being found advantageous for this purpose. This plate 11 shaped to conform to the contour of the lateral wall of the casing as shown in Figure 2, and the recess therein is of such depth and the coil is of such size so that the latter will come within the surface of the material. The carrier for the resistance coil is of a thickness as to substantially fill the space between the bottom of the receptacle and casing with the upper surface adjacent to, but out of contact with the bottom of the receptacle. The recess 10 is of such shape so that the surface serves as a deflective surface to deflect the heat emitted or radiated from the coil, and said recess surface is also arranged to serve as a reflective surface for the radiant or incandescent rays from the coil, whereby the heat radiated from the coil will be deflected and the luminosity of the coil reflected in a direction toward the bottom of the receptacle, with the result that practically all of the heat generated by the coil will be impinged directly against the bottom of the receptacle and transmitted from the bottom of the receptacle to the side wall, which latter wall due to the air space between the same and the side wall of the casing, will be transmitted to the contents in the receptacle to be heated or cooked without practically any waste of the heat, as such air space will serve as an insulation for the heat which may have a tendency to be radiated from the side of the receptacle as the air confined in the space will be stationary as circulation thereof will be impossible due to the air tight connection between the receptacle and casing. The thickness of the material of the coil carrier 11 is somewhat greater than the depth of the coil carrying recess therein, and as the material of which the coil carrier is made is not only a good non-conductor of electricity but also a good heat insulator the possibility of transmitting the heat radiated from the coil through said material to the material of the casing is reduced to a minimum thereby greatly increasing the efficiency of the coil in heating the receptacle 5.

The ends of the coil 9 are connected in electrical connection with contact terminals 12, 13 extending through the wall of the casing 6 from the interior to the exterior of the latter. To secure the contact terminals in and insulate the same from the wall of the casing a perforated block of insulating material 14 is arranged at the outer side of the casing with the perforations therein in line with perforations in the casing opposite to a recessed portion 15 in the insulating material 11, flanged bushings of insulating material 17 extending through the perforations in the casing wall into the perforations of the insulator block 14 with the flanges engaging the inner surface of the casing. The contact terminals are in the form of pins having a threaded reduced end extending through the perforations in the insulator block and bushings with the shoulder formed by the reduced portion engaging the outer side of the block with binding nuts 19, 20 threaded onto the ends within the casing in a recessed portion 16 of the coil carrier 11, the nuts 19 serving to clamp the insulator block and bushings firmly to the wall of the casing and the nuts 20 clamping the terminals of the heating coil to the nuts 19. The outer ends of the contact pins 12, 13 are extended beyond the block for the engagement of sockets in an electric connection plug to connect the device to a source of electricity. The utensil is preferably provided with suitable carrying means and shown as consisting of a handle 21.

To secure the coil 9 in the recess portions of the material 11 the material is drilled through from the bottom at opposite sides of the recess, as shown at 22. The ends of wires 23 are then passed downwardly through said openings to engage over the coil. The material of the plate 11 at the bottom between a pair of said openings 22 is gouged out to form a recess and the ends of the wire 23 are twisted together and adjusted to engage in said recess when the recess is filled with material of which the plate 11 is made imbedding the twisted ends of the wires therein, as clearly shown at 24 in Figure 4.

Having thus described my invention I claim:

1. In an electric cooking utensil, a casing, a receptacle suspended in the casing, said receptacle and casing being constructed and arranged to provide an air space between the receptacle and casing, a resistance coil, and a carrier for said coil of non-conducting and heat insulating material interposed between the bottom of the receptacle and casing, said coil being mounted in the upper face of said carrier adjacent and exposed to but out of contact with the bottom of the receptacle.

2. In an electric cooking utensil, an open end casing, a receptacle having an air tight connection at the edges of the opening therein with the edges of the opening in the casing and suspended in the casing with the bottom thereof in spaced relation to the bottom of the casing, and a heating element in the space between the bottom of the receptacle and casing comprising non-conducting and heat insulating material with the upper surface adjacent to, but out of contact with the bottom of the receptacle, and a resistance coil mounted in a recessed portion of said material opening through the upper surface thereof for the purpose specified.

3. In an electric cooking utensil, an open end casing, a receptacle suspended in the casing with a space between the bottom of the receptacle and casing and the side wall of the receptacle converging toward the bottom to provide a space between the sides of the receptacle and casing, said receptacle and casing being secured together in fluid tight connection at the edges of the openings therein, and a heating element comprising non-conducting and heat insulating material engaging in the space between the bottom of the receptacle and casing with the upper surface adjacent to the bottom of the receptacle and having recesses in said surface, and a heating coil in said recesses connected in circuit with contact terminals extending through and insulated from the wall of the casing.

4. In an electric cooking utensil, a casing, a receptacle suspended in the casing to provide a closed chamber in the casing; a mass of non-conducting and heating insulating material arranged in the chamber having recesses in the face thereof adjacent the receptacle, and a resistance coil engaging in said recesses arranged in a plane below the surface of said material.

5. In an electric cooking utensil, a casing, a receptacle suspended in the casing to provide a closed chamber in the casing, a plate of non-conducting and heating insulating material interposed between the bottom of the receptacle and casing with one surface contiguous to but out of contact with the receptacle and having recesses in said surface with the wall of the recess arranged as a reflective and deflective surface, and a resistance coil engaging in said recesses.

6. In an electric cooking utensil, a pair of receptacles arranged in nested and spaced relation, and a heating element interposed in the space between the receptacles constructed and arranged to electrically insulate the same from the receptacles and to impinge the heat generated and radiated by said element directly against the inner receptacle and insulate the heat from the outer receptacle.

Signed at the city of New York, in the county of New York and State of New York this 10th day of March 1922.

ROBERT E. PEARSON.